United States Patent [19]
Rossetti, Jr.

[11] 3,864,228
[45] Feb. 4, 1975

[54] MOLDABLE AND HEAT RECOVERABLE COMPOSITION COMPRISING AN ADMIXTURE OF VINYLIDENE FLUORIDE/HEXAFLUOROPROPYLENE COPOLYMER AND A POLYMER OF VINYLIDENE FLUORIDE

[75] Inventor: Louis F. Rossetti, Jr., Arlington, Mass.

[73] Assignee: Electronized Chemicals Corporation, Burlington, Mass.

[22] Filed: July 13, 1973

[21] Appl. No.: 378,807

Related U.S. Application Data

[63] Continuation of Ser. No. 137,620, April 26, 1971, abandoned.

[52] U.S. Cl....... 204/159.2, 204/159.17, 260/42.27, 260/884, 260/900
[51] Int. Cl............................. C08d 1/00, C08f 1/00
[58] Field of Search.................. 260/900; 204/159.2

[56] References Cited
UNITED STATES PATENTS
3,769,371  10/1973  Nersasian........................... 260/900

*Primary Examiner*—Murray Tillman
*Assistant Examiner*—Richard B. Turer
*Attorney, Agent, or Firm*—Russell & Nields

[57] ABSTRACT

A moldable and heat recoverable composition with improved heat aging and electrical insulating characteristics comprising an admixture of vinylidene fluoride/hexafluoropropylene copolymer and a polymer of vinylidene fluoride, which may be the homopolymer, cross-linked by exposure to from 1 to 20 megarads of ionizing radiation. The resultant composition has qualities superior to the starting components, and its flexibility can be controlled by the relative amount of each component added to the admixture.

3 Claims, No Drawings

MOLDABLE AND HEAT RECOVERABLE COMPOSITION COMPRISING AN ADMIXTURE OF VINYLIDENE FLUORIDE/HEXAFLUOROPROPYLENE COPOLYMER AND A POLYMER OF VINYLIDENE FLUORIDE

This is a continuation of application Ser. No. 137,620, filed Apr. 26, 1971, and now abandoned.

BACKGROUND OF THE INVENTION

1. Field of the Invention

This invention pertains to thermosetting polymeric compositions. More particularly, it pertains to a cured admixture of vinylidene fluoride/hexafluoropropylene copolymer and a polymer of vinylidene fluoride.

2. Description of the Prior Art

A number of thermosetting plastic compositions are currently available for use in high temperature applications. A considerable degree of variance is encountered in their physical properties both at room temperature and when subjected to elevated temperatures for various period of time. Fluoroelastomer rubbers, about which much information has been published, have been used quite successfully within the temperature range of 150°C. to 300°C. for various electrical insulating purposes, such as wire insulation and molded shaped insulating pieces. One fluoroelastomer that exhibits excellent thermal stability properties is vinylidene fluoride/hexafluoropropylene copolymer, varieties of which are produced commercially by companies such as E. I. Dupont de Nemours, Inc. (under the trademark "VITON") and 3M Company (under the trademark FLUORIL). VITON is a copolymer containing from 70 to 30% by weight of vinylidene fluoride units and from 30 to 70% by weight of hexafluoropropene units. The gum stock is normally processed by compounding with a metal oxide and polyfunctional amine and curing via a two-step cycle. The metal oxide and polyfunctional amine dehydrofluorinate the vulcanizite under heat, followed by the addition of amine to afford chemical cross-linking. The polyfunctional amine reaction generates moisture that is removed in the second step by oven baking the partially cured samples. The curing process typically requires a press step lasting 30 minutes at a temperature from 135° to 163°C., and a baking step lasting 24 hours at a temperature from 204° to 260°C.

The cured VITON copolymer can be heated to near its original melting point, expanded in an air pressure or vacuum sizing system, chilled in the expanded state and then heat recovered over an electrical conductor. As a gum stock, however, it cannot be expanded. Like most general fluoroelastomers the cured polymer degrades by chain scission under radiation exposure, especially at the higher temperatures at which they are otherwise most useful.

Another polymer with desirable physical and thermal properties is vinylidene fluoride polymer cross-linked by high-energy ionizing radiation. The cross-linking cure is taught by Timmerman in U.S. Pat. No. 3,142,629, and requires at least 8 megarads of radiation. Unlike other fluorinated polymers vinylidene fluoride resins undergo cross-linking rather than degradation from ionizing radiation up to at least 100 megarads. The cured polymer exhibits good short-term resistance to high temperatures, but deteriorates under long-term exposures, and tends to split when heat recovered over metal conductors.

SUMMARY OF THE INVENTION

It has been found that when the uncured vinylidene fluoride/hexafluoropropylene copolymer is blended with uncured vinylidene fluoride polymer, irradiating the blend with as little as one megarad produces a superior material with excellent electrical insulating properties. The new material achieves a thermal aging rating greater than that of vinylidene fluoride polymer as cured according to Timmerman and on a par with vinylidene fluoride/hexafluoropropylene cured by the above-described two-step process, yet is easier to process and exhibits greater dielectric strength than the latter. The flexibility of the new material may be controlled by adjusting the relative proportion of each component in the blend. It is easily extruded, heat recovered or molded, and is readily adapted to use as a heat recoverable sleeving, wire or cable insulation, or molded insulating device. Accordingly, it is an object of this invention to provide a new composition with improved heat/age stability, electrical and radiation properties, and a method for creating the new composition. Another object of this invention is the provision of a new heat resistant insulating composition comprising an irradiated blend of vinylidene fluoride/hexafluoropropylene resin and vinylidene fluoride polymer, having characteristics superior to either of its components as cured by currently used techniques.

Various other objects and advantages of the present invention will become apparent to those skilled in the art from the ensuing description and disclosure.

DETAILED DESCRIPTION OF THE INVENTION

Uncured vinylidene fluoride/hexafluoropropylene copolymer and uncured vinylidene fluoride polymer are first blended together on a thermoplastic or rubber mill in relative proportions selected according to the flexibility sought from the final composition. After an intermediate processing step such as molding or extrusion, the blend is exposed to high energy radiation. The particular techniques involved in radiation process of plastics are known in the art, and it is not necessary to repeat them (e.g. Smith, *Radiation Processing of Plastics*, MODERN PLASTICS Encyclopedia, 1965 edition). What is unique here is a radiation cured blend of two particular materials, one of which is by itself normally cured by chemical means, to emerge with a new material that retains or exceeds desirable qualities found in each component. In addition, it has been discovered that whereas a minimum of 8 megarads are necessary to cross-link polyvinylidene fluoride, only 2 or 3 megarads of radiation are necessary to cross-link the present composition when a common cross-linking promoter is added to the blend. Since polyvinylidene fluoride begins to decompose at a radiation exposure much above 100 megarads, a practical limitation is thereby imposed on the radiation-dependent crosslink density that can be achieved. Commencement of cross-linking at lower radiation levels permits higher cross-link densities both absolutely and at each radiation level.

In order to illustrate the process and composition of this invention, the following two examples are presented. These examples are for purposes of illustration and are not to be construed as unnecessarily limiting, either as to relative amounts or the nature of the ingredients. For example, it is not necessary that the homopolymer of vinylidene fluoride be used; a certain amount of dilution by other resin forming organic materials is permissible. In fact the vinylidene fluoride polymer used in the following examples, produced by Pennwalt, Inc. under the tradename "KYNAR," contains about 5 percent by weight of tetrafluoroethylene.

EXAMPLE I.

275 parts by weight of Kynar 5200 was blended with 225 parts of Viton AHV, 15 parts of triallyl isocyanurate (a cross-linking promotor) and 5 parts of a color concentrate containing channel black and Kynar 5,200 to a 20:1 let down ratio; the blend was then irradiated.

EXAMPLE II.

430 parts by weight of Kynar 5,200 was blended with 70 parts of Viton AHV, 15 parts of triallyl isocyanurate, and 5 parts of the color concentrate of Example 1, then irradiated. The Viton AHV used in the foregoing examples is a copolymer of nominal composition: 60 weight % vinylidene fluoride and 40 weight % hexafluoropropylene or 77.8 mole % $CH_2 = CF_2$ and 22.2 mole % $CF_3CF = CF_2$. The molecular weight (Mn) of VITON AHV is 200,000.

Referring to a recent article by Howard Reymers (A New Temperature Index: Who Needs It, What Does It Tell, MODERN PLASTICS, Sept., 1970, pp. 78–81), a thermal aging rating system used by Underwriters' Laboratories is presented in which an Arrhenius curve of time to 50% reduction in impact, tensile or dielectric strength versus temperature is plotted for the test material and compared to a control. According to this system the new insulating material of the present invention can be conservatively rated on 200°C. This rating exceeds that for Kynar (175°C.) and is on a par with chemically cured Viton.

Tests have been performed on a group of materials used by the aerospace/airframe industry and considered outstanding with respect to thermal age stability and electrical properties, and the results compared with those for Examples I and II in Table I.

An inspection of Table I will reveal that the novel material herein described may be advantageously used as an insulating sleeving. The material readily adapts to well known heat recovering techniques whereby a closely fitted sleeving is formed.

The materials of Examples I and II have different flexibilities, as indicated by the secant modulus at a 2% strain (ASTM D882), flexibility increasing as secant modulus decreases. Table II compares Examples I and II with their components and with two popular thermoplastics.

TABLE I

TYPICAL PROPERTIES OF PREFERRED INSULATION SLEEVINGS

| Test | Example I | Example II | Kynar 5200 | Viton' | Polyethylene(AMS-3636B) |
|---|---|---|---|---|---|
| Tensile strength (psi) | 5,000 | 6,700 | 3,900 | 1,700 | 2,600 |
| Elongation (%) | 300 | 300 | 150 | 400 | 300 |
| Specific Gravity | 2.0 | 2.3 | 1.8 | 1.7 | 1.3 |
| Dielectric Strength (Fed.Std.406) (VPM) | 1,000 | 1,000 | * | 600 | 1,175 |
| Dielectric Constant (Fed.Std.406) (1 mhz) | 4.88 | 4.66 | 6 | approx.6 | 2.5 |
| Heat Resistance 168 hrs. at 175°C. Mandrel Bend, No Cracking | Pass | Pass | Pass | Pass | Pass |
| Heat Resistance 96 hrs. at 250°C. | | | | | |
| A) Tensile strength (psi) | 3,400 | 3,500 | * | * | Samples Broke |
| B) Elongation (%) | 200 | 130 | 250 | 250 | |
| C) Dielectric strength(VPM) | 1,300 | 1,100 | 1,000 | * | |
| Heat Resistance 1000 Hrs. at 225°C. No Drip, Cracks | Pass | Pass | Fail | * | Fail |

* Based on 80 Shore A cured stock
* not tested

TABLE II

SECANT MODULUS AT 2% STRAIN, in PSI

| | |
|---|---|
| Example I | 50,000 |
| Example II | 116,000 |
| Kynar 5200 | 200,000 |
| Viton | * |
| Flexible polyvinyl chloride | 10,000 |
| Low density polyethylene | 20,000 |

*Viton secant modulus varies with degree of amine/metal oxide cure, lowest with no cure. Unable to determine secant modulus on non-cured sample.

Because of the new material's ease of processing, reduced dielectric constant over its component materials and its excellent flexibility and thermal aging characteristics, is may be used as a wire cable insulation. One example of a particular application is MIL-W-16878, covering wiring insulations rated at 105°C. to 260°C. It has a gap between 105°C. and 200°C. where no material is covered. It may be assumed from Table I that even a high concentration of vinylidene fluoride, which appears to reduce elongation, may be safely rated at 175°C. and fit into the MIL-SPEC scheme.

Another area in which the material is particularly useful is as a molded electrical insulating device. The flow of the material in a compression mold indicates it can be molded into electrical connectors and the like with little shrinkage and a minimum of the voids typical of molding materials. The thickest sections of the molded part should be related to the energy of the irradiation device to ensure cross-linking throughout the part. For example, electrons at an energy level of 1 MeV penetrate unit density stock approximately one-eighth inch, so thicker sections would require higher energy levels.

It is to be understood that the foregoing description and examples are by way of illustration only and not for the purpose of limitation. Numerous changes and variations may be made without departing from the spirit and scope of the invention, which is limited only in terms of the appended claims.

I claim:

1. A novel thermosetting composition comprising an admixture of vinylidene fluoride/hexafluoropropylene copolymer, containing from 70 to 30% by weight of vinylidene fluoride units and from 30 to 70% by weight of hexafluoropropene units, and a polyvinylidene fluoride, cross-linked by irradiation with highenergy electrons in a range of approximately 1–20 megarads, and wherein the ratio of weight of vinylidene fluoride/hexafluoropropylene copolymer to vinylidene fluoride polymer is in the range of 225:275 to 70:430.

2. The novel composition of claim 1 wherein said polymer of vinylidene fluoride is a homopolymer of vinylidene fluoride.

3. A molded structure comprising an admixture of vinylidene fluoride/hexafluoropropylene copolymer, containing from 70 to 30% by weight of vinylidene fluoride units and from 30 to 70% by weight of hexafluoropropene units, and a polyvinylidene fluoride, cross-linked by irradiation with high-energy electrons in a range of approximately 2–100 megarads, and wherein the ratio by weight of vinylidene fluoride/hexafluoropropylene copolymer to vinylidene fluoride polymer is in the range of 225:275 to 70:430.

* * * * *